United States Patent
Witte et al.

(10) Patent No.: US 12,246,568 B2
(45) Date of Patent: Mar. 11, 2025

(54) METHOD FOR CONTROLLING A HYDRAULIC ACTUATOR OF AN ACTIVE CHASSIS

(71) Applicant: Dr. Ing. h.c. F. Porsche Aktiengesellschaft, Stuttgart (DE)

(72) Inventors: Thomas Witte, Heimerdingen (DE); Jochen Liebold, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/632,551

(22) Filed: Apr. 11, 2024

(65) Prior Publication Data
US 2024/0416702 A1  Dec. 19, 2024

(30) Foreign Application Priority Data

Jun. 13, 2023 (DE) .......................... 102023115398.6

(51) Int. Cl.
*B60G 17/015* (2006.01)

(52) U.S. Cl.
CPC .... *B60G 17/0152* (2013.01); *B60G 2202/413* (2013.01); *B60G 2400/5182* (2013.01); *B60G 2500/104* (2013.01)

(58) Field of Classification Search
CPC .......... B60G 17/0152; B60G 2202/413; B60G 2400/5182; B60G 2500/104
See application file for complete search history.

(56) References Cited

U.S. PATENT DOCUMENTS

| | | | | |
|---|---|---|---|---|
| 5,137,299 A * | 8/1992 | Jones | ................... | B60G 17/018 280/124.157 |
| 5,769,400 A * | 6/1998 | Holzl | ..................... | B60G 17/04 280/5.509 |
| 2008/0202875 A1 * | 8/2008 | Siebeneick | ........ | B60G 17/0152 188/298 |
| 2018/0281544 A1 * | 10/2018 | Masamura | ............. | B60G 13/08 |
| 2018/0326810 A1 * | 11/2018 | Masamura | ......... | B60G 17/0165 |

(Continued)

FOREIGN PATENT DOCUMENTS

| | | |
|---|---|---|
| DE | 102011076849 A1 | 12/2012 |
| DE | 102018221576 A1 | 6/2020 |

(Continued)

OTHER PUBLICATIONS

German Examination Report for German Application No. 10 2023 115 398.6, dated Apr. 30, 2024 with English translation. (9 pages).

*Primary Examiner* — Faye M Fleming
(74) *Attorney, Agent, or Firm* — Buchanan Ingersoll & Rooney PC

(57) ABSTRACT

A method of controlling a hydraulic actuator of an active spring damper element in a vehicle for damping a relative movement between a vehicle structure and a wheel suspension. A hydraulic arrangement is provided for controlling the hydraulic actuator, which includes a hydraulic pump and at least one control valve. In a first method step, a relative movement between the vehicle structure and wheel suspension is detected. A force to be provided by the hydraulic actuator and a volume flow to be provided by the hydraulic pump are determined based on the detected relative movement. Then, a speed of the hydraulic pump is set to provide the volume flow required for the position of the force.

17 Claims, 2 Drawing Sheets

(56) References Cited

U.S. PATENT DOCUMENTS

| | | | |
|---|---|---|---|
| 2019/0047350 A1* | 2/2019 | Thomae | ................ B60G 17/08 |
| 2022/0118810 A1 | 4/2022 | Anderson et al. | |

FOREIGN PATENT DOCUMENTS

| | | |
|---|---|---|
| DE | 102017117658 A1 | 6/2021 |
| DE | 102021117081 A1 | 1/2023 |
| EP | 3378684 A1 | 9/2018 |
| JP | S60213512 A | 10/1985 |
| JP | 2013174262 A | 9/2013 |
| JP | 2014040129 A | 3/2014 |
| JP | 2015101261 A | 6/2015 |
| JP | 2017094808 A | 6/2017 |

* cited by examiner

METHOD FOR CONTROLLING A HYDRAULIC ACTUATOR OF AN ACTIVE CHASSIS

CROSS-REFERENCE TO RELATED APPLICATION

This application claims priority to German Patent Application No. 10 2023 115 398.6, filed Jun. 13, 2023, the content of such application being incorporated by reference herein in its entirety.

FIELD OF THE INVENTION

The present invention relates to a method for controlling a hydraulic actuator of an active chassis or an active spring damping element in a vehicle.

BACKGROUND OF THE INVENTION

In order to meet the requirements in terms of driving comfort and driving safety in different driving situations, many vehicle manufacturers rely on damper systems with so-called active dampers with a hydraulic actuator. During operation, the behavior of such dampers may be highly dynamically adjusted to the corresponding requirements with regard to the damping properties and the force to be provided. For this purpose, a hydraulic arrangement consisting of two hydraulic chambers separated by a piston is connected to the hydraulic actuator, wherein the pressure in the hydraulic chambers can be changed in order to change the damping properties and the force provided by the damper or the hydraulic actuator. Typically, the hydraulic arrangement for setting the corresponding pressures comprises a hydraulic pump and two controllable valves (called control valves or damper valves). Such a system is known from the patent specification DE 10 2017 117 658 A1, which is incorporated by reference herein, for example.

In order to operate the hydraulic actuator, the speed must be controlled in order to be able to provide corresponding forces. Document DE 102011076849 A1, which is incorporated by reference herein, discloses how to control the speed and rotational direction of the hydraulic pump of an active chassis system based on measured pressures in the supply lines of a double-acting hydraulic actuator. Document JP 2013174262, which is incorporated by reference herein, describes how to control the motor of a hydraulic pump of an active damper based on the pressure in a supply line and a damper force signal. Document JP 2014040129, which is incorporated by reference herein, A describes how to determine a speed control value of a pump motor of a hydraulic pump by multiplying the deviation between a thrust control value and a current thrust value by a control gain. Patent specification JP 2015101261, which is incorporated by reference herein, relates to an active chassis and describes how to determine a target control force based on vertical accelerations/speed of an upper and a lower part of a spring of the chassis and how to control the speed of the pump of the active chassis so that the target control force can be generated. It is known from the patent specification EP 3378684 A1, which is incorporated by reference herein, how to control the speed of the pump of an active chassis based on properties of a roadway ahead. Document DE 102021117081 A1, which is incorporated by reference herein, describes how to determine a motor requirement for the pump motor of an active chassis based on an instantaneous force requirement. Patent specification JP 2017094808 A, which is incorporated by reference, describes how to determine the speed of the pump of an active chassis based on the extension/retraction speed of an actuator. From document JP S60213512 A, which is incorporated by reference herein, it is known how to control the pump of an active chassis based on a relative movement between the vehicle body and the shaft of a wheel. Document US 2022118810 A1, which is incorporated by reference herein, relates to an active chassis and describes how to adjust a torque or speed setting in response to a wheel event.

SUMMARY OF THE INVENTION

Described herein is an alternative method for controlling a hydraulic actuator of an active spring damper element.

The method according to aspects of the invention is configured to control a hydraulic actuator of an active spring damper element in a vehicle for damping a relative movement between a vehicle structure and a wheel suspension, wherein a hydraulic arrangement is provided for controlling the hydraulic actuator, which comprises a hydraulic pump and at least one control valve. According to aspects of the invention, in a first method step, a relative movement between the vehicle structure and wheel suspension is detected. The vehicle construction refers to the complete vehicle without the wheel suspension and the wheels. The term thus refers to the mass to be decoupled from the vertical movements of the wheel suspension or the wheel by the spring damper system. Furthermore, a force to be provided by the hydraulic actuator and a volume flow to be provided by the hydraulic pump are determined based on the detected relative movement. When determining the force, the direction of the force, the amplitude, i.e., the amount, of the force, and the dynamics of the force are in particular taken into account. Then, a speed of the hydraulic pump is set so that the required volume flow is provided. The term volume flow is always understood in the context of the application to mean the volume flow of the hydraulic fluid provided by the hydraulic pump to the hydraulic chambers of the hydraulic actuator. Preferably, the required volume flow is then converted into a hydraulic pump speed required to generate the volume flow by using a characteristic map.

In this way, control of the hydraulic pump, or more specifically the speed of the hydraulic pump, is possible.

In a preferred embodiment of the invention, the force to be provided by the hydraulic actuator is provided by controlling the at least one control valve in the hydraulic actuator. This is achieved by changing the opening position of the control valve, allowing the pressure in a hydraulic chamber of the hydraulic actuator to be changed. Particularly preferably, the force is achieved by a pressure drop in one of the hydraulic chambers of the hydraulic actuator. A pressure drop by increasing the opening position of the control valve may be implemented faster than a pressure buildup, thereby increasing the dynamics of the force and improving control of the hydraulic actuator.

In a further preferred embodiment of the invention, the relative movement between the wheel or wheel suspension and the vehicle structure is already predictively detected, i.e., before the relative movement occurs. This is achieved in particular by analyzing the ground condition ahead of the vehicle, particularly preferably using an optical sensor. Alternatively or additionally, information from a database may also be used to analyze the ground condition. Predictive detection of the relative movement allows the hydraulic pump and control valve to be adjusted at an early stage in order to increase the dynamics of the system and to be able to set the force directly from the start without delay when required.

In a further preferred embodiment of the invention, a driver input is taken into account when determining the volume flow required for the force to be provided and to be provided by the hydraulic pump. This contains information on the desired behavior of the chassis, in particular with regard to a sporty or comfort-oriented driving style, or the like. This driver input can be made, for example, by selecting different driving modes, as is already known in the prior art. This allows the operation of the hydraulic actuator and thus the spring damper element to be adjusted to the needs of the driver.

BRIEF DESCRIPTION OF THE DRAWINGS

Further advantages, aspects and details of the invention arise from the following description with reference to the accompanying figures. They show.

DETAILED DESCRIPTION OF THE INVENTION

Figure 1:
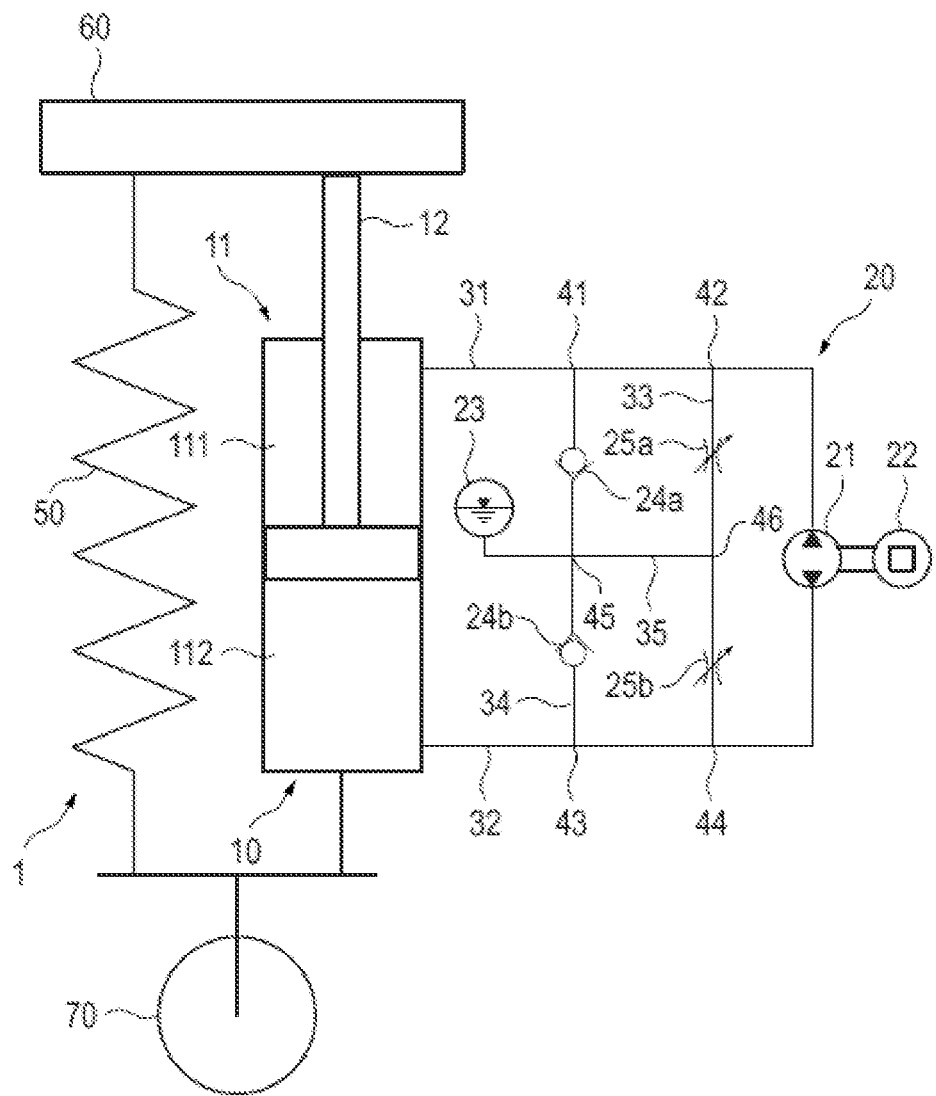
FIG. 1 shows a spring damper element 1 having a hydraulic actuator 10.

FIG. 1 shows a spring damper element 1 having a hydraulic actuator 10. The hydraulic actuator 10 has a hydraulic cylinder 11 in which a piston 12 can be moved up and down, back and forth, in the drawing plane of FIG. 1. The hydraulic cylinder 11 with the piston 12 represents the damper of the spring damper element 1 as the hydraulic actuator 10.

For example, the hydraulic actuator 10 is part of a wheel suspension system in a vehicle (not shown). For example, the wheel suspension system has a front axle with two front wheels and a rear axle with two rear wheels. A wheel suspension 70 is schematically shown in FIG. 1 as an example of these possibilities. Typically, at least one hydraulic actuator 10 is associated with each wheel. In addition to the hydraulic actuator 10, i.e., the damper, the spring damper element 1 comprises a spring element 50, which is arranged parallel to the hydraulic actuator 10. The spring damper element 1 connects a vehicle structure 60 to the wheel suspension 70 and is configured not to transfer vertical movement of the wheel to a vehicle structure 60, in order to improve comfort for the vehicle occupants. It is therefore intended to decouple the wheel suspension 70 from vehicle structure 60. To achieve this in the best possible way, the hydraulic actuator 10 is designed to be active, whereby the force it provides can be controlled.

The hydraulic cylinder 11 is designed as a double-acting hydraulic cylinder 11 having a first hydraulic chamber 111 and a second hydraulic chamber 112. A hydraulic arrangement 20 is provided to control the hydraulic actuator 10.

The hydraulic arrangement 20 comprises a hydraulic pump 21 embodied as a reversing pump, for example, that is operable by an electric motor 22. The hydraulic arrangement 20 operates with a hydraulic medium from a hydraulic reservoir 23.

The first hydraulic chamber 111 of the hydraulic cylinder 11 is connected to one side of the hydraulic pump 21 via a first hydraulic line 31. The second hydraulic chamber 112 of the hydraulic cylinder 11 is connected to the other side of the hydraulic pump 21 via a second hydraulic line 32.

First hydraulic branches 41 and a second hydraulic branch 42 are provided in the first hydraulic line 31. Third hydraulic branches 43 and a fourth hydraulic branch 44 are provided in the second hydraulic conduit 32. The second branches 42 and fourth branch 44 are connected by a third hydraulic line 33. The first branches 41 and third branch 43 are connected by a fourth hydraulic line 34.

A fifth hydraulic branch 45 is provided in the fourth hydraulic line 34. A sixth hydraulic branch 46 is provided in the third hydraulic line 33. A fifth hydraulic line 35 extends from the sixth branch 46 to the hydraulic medium reservoir 23 via the fifth branch 45.

A first check valve 24a is arranged in the fourth hydraulic line 34 between the first branches 41 and the fifth branch 45. A second check valve 24b is also arranged in the fourth hydraulic line 34 between the third branches 43 and the fifth branch 45. The check valves 24a and 24b both close towards the fifth branch 45.

A first control valve 25a, also referred to as a damping valve or damping control valve, is arranged in the third hydraulic line 33 between the second branches 42 and the sixth branch 46. A second control valve 25b, also referred to as a damping valve or damping control valve, is arranged in the third hydraulic line 33 between the sixth branches 46 and the fourth branch 44.

By adjusting a pressure difference between the first hydraulic chamber 111 and the second hydraulic chamber 112, a force of the damper 10, or more specifically the hydraulic piston 12, can be set. If the hydraulic pump 21 is operated in such a way that a certain pressure is applied to the first hydraulic line 31, this pressure is applied in the first hydraulic chamber 111.

Figure 2:
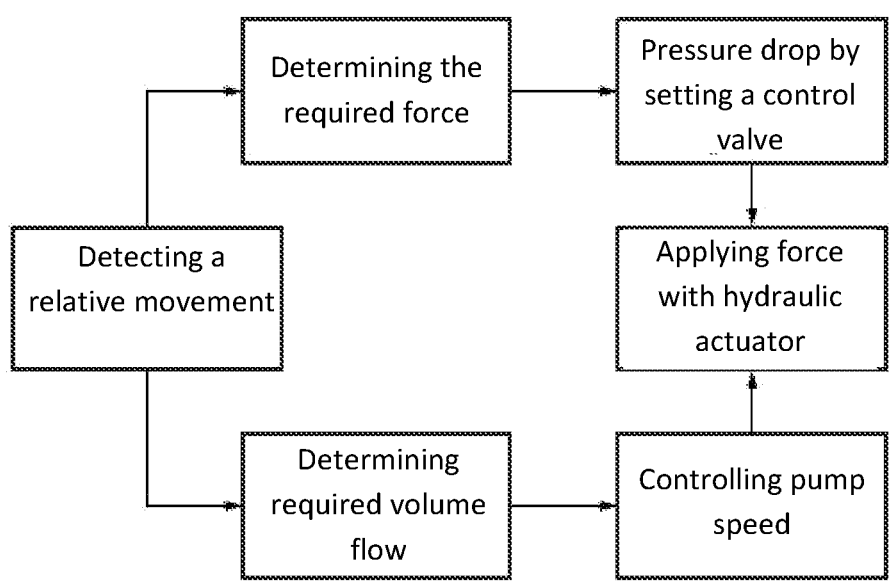
FIG. 2 shows a flow chart of an embodiment of the invention of a method for controlling a hydraulic actuator 10.

FIG. 2 shows a flow chart or flow diagram of an embodiment of the method according to aspects of the invention, which is explained in more detail below with reference to FIG. 1. In a first method step, a relative movement is determined between the vehicle structure 60 and the wheel suspension 70. Suitable accelerometers may be provided for this purpose, for example, which detect movement of both the vehicle structure 60 and the wheel suspension 70 and thus the relative movement can be calculated. Alternatively, there are a variety of other ways to detect a relative movement. When detecting the relative movement, it is analyzed in particular with regard to the maximum movement, i.e., the amount of change in the position, as well as the dynamics with which the movement takes place.

A force to be provided by the hydraulic actuator is then determined based on the detected relative movement, taking into account in particular the direction of the force, the amplitude, i.e., the amount of the force, and the dynamics of the force. The determined force is then used to adjust the force setting by changing the opening position of a control valve 25a, 25b and the force is set accordingly. The force is preferably achieved by a pressure drop in the corresponding hydraulic chamber 111, 112, which is caused by an opening of the corresponding control valve 25a, 25b. For example, if a compression force is to be applied to the wheel suspension 70 by hydraulic actuator 12, the first control valve 25a increases its opening position, thereby decreasing the pressure in the first hydraulic chamber 111 and pushing the piston of the hydraulic actuator 10 upwards in the drawing plane, thus allowing the force to be applied.

At the same time, the volume of the second hydraulic chamber 112 increases abruptly, so that the pressure is on the verge of dropping here too. To compensate for this, a volume flow required for the force and to be provided by the hydraulic pump 21 at the second hydraulic chamber 112 is determined based on the detected relative movement between the vehicle structure 60 and the wheel suspension 70. The required pump speed and conveying direction are then determined from the required volume flow and the hydraulic pump 21 is operated accordingly. The cooperation of the control valves 25a, 25b and the hydraulic pump 21 can thus provide the required force to be provided by the hydraulic actuator.

In cases in which the volume flow induced by the relative movement from one hydraulic chamber 111, 112 into the other hydraulic chamber 112 via one of the control valves 25a, 25b and check valves 24a, 24b is sufficient, no additional volume flow needs to be provided through the hydraulic pump 21.

What is claimed is:

1. A method of controlling a hydraulic actuator of an active spring damper element in a vehicle for damping relative movement between a vehicle structure and a wheel suspension, wherein a hydraulic arrangement comprising a hydraulic pump and at least one control valve is arranged to control the hydraulic actuator, the method comprising the steps of:
    either predicting or detecting a relative movement between the vehicle structure and wheel suspension,
    determining a force to be applied by the hydraulic pump and the at least one control valve of the hydraulic actuator based on the predicted or detected relative movement,
    determining a volume flow to be delivered into a first chamber of the hydraulic actuator by the hydraulic pump, said determined volume flow being based on the predicted or detected relative movement,
    determining a speed of the hydraulic pump to achieve the determined force and the determined volume flow, and
    applying said determined force by (i) adjusting an opening setting of the at least one control valve, which causes a pressure drop in a second chamber of the hydraulic actuator that is fluidly connected to the at least one control valve, and (ii) operating the hydraulic pump at said determined speed to deliver said determined volume flow into the first chamber of the hydraulic actuator.

2. The method according to claim 1, wherein the force to be provided is provided by controlling the at least one control valve in the hydraulic actuator.

3. The method according to claim 1, wherein the control valve is controlled such that a pressure drop occurs in a hydraulic chamber of the hydraulic actuator.

4. The method according to claim 1, wherein the relative movement is already predictively detected.

5. The method according to claim 1, wherein a driver input is taken into account when determining the volume flow.

6. The method according to claim 1, wherein the step of either predicting or detecting the relative movement between the vehicle structure and wheel suspension comprises predicting the relative movement between the vehicle structure and wheel suspension by analyzing a ground condition ahead of the vehicle.

7. The method according to claim 1, wherein the step of either predicting or detecting the relative movement between the vehicle structure and wheel suspension comprises detecting the relative movement between the vehicle structure and wheel suspension using an accelerometer.

8. The method according to claim 1, wherein the hydraulic pump is a reversible pump, wherein a first side of the pump is fluidly connected to the first chamber of the hydraulic actuator via a first hydraulic line and a second side of the pump is fluidly connected to the second chamber of the hydraulic actuator via a second hydraulic line.

9. The method according to claim 8, wherein a third hydraulic line fluidly interconnects the first and second hydraulic lines, and wherein the at least one control valve is directly and fluidly connected to the third hydraulic line.

10. The method according to claim 9, wherein a fourth hydraulic line interconnects the first and second hydraulic lines, and wherein the third and fourth hydraulic lines are fluidly interconnected together by a fifth hydraulic line.

11. The method according to claim 10, further comprising a first check valve that is directly and fluidly connected to the fourth hydraulic line.

12. The method according to claim 11, wherein a second check valve is directly and fluidly connected to the fourth hydraulic line, and wherein said first and second check valves are disposed on opposite sides of an intersection point connecting the fourth and fifth hydraulic lines.

13. The method according to claim 10, wherein a hydraulic reservoir is directly and fluidly connected to the fifth hydraulic line.

14. The method according to claim 9, wherein another control valve is directly and fluidly connected to the third hydraulic line, and said at least one control valve and said another control valve are disposed on opposite sides of an intersection point connecting the third and fifth hydraulic lines.

15. The method according to claim 1, wherein the adjusting and operating steps are performed at the same time.

16. The method according to claim 1, wherein said determined volume flow is set as a function of a driving style that is input by a user of the vehicle.

17. The method according to claim 1, wherein the step of determining the force comprises determining a direction of the force and an amplitude of the force.

* * * * *